United States Patent
Uehara

[11] Patent Number: 6,145,797
[45] Date of Patent: Nov. 14, 2000

[54] LOCK DEVICE, DISPLAY APPARATUS AND LIQUID CRYSTAL APPARATUS

[75] Inventor: Makoto Uehara, Zama, Japan

[73] Assignee: Canon Kabushiki Kaisha, Tokyo, Japan

[21] Appl. No.: 08/982,521

[22] Filed: Dec. 2, 1997

[30] Foreign Application Priority Data

Dec. 4, 1996 [JP] Japan ................................. 8-324351

[51] Int. Cl.$^7$ .............................. E04G 3/00; E05C 17/64
[52] U.S. Cl. .......................... 248/291.1; 16/342; 403/84; 248/917
[58] Field of Search ........................ 248/291.1, 292.11, 248/292.13, 917, 919, 922, 923, 371; 403/84, 87, 110, 329; 16/305, 307, 308, 342

[56] References Cited

U.S. PATENT DOCUMENTS

| | | | |
|---|---|---|---|
| 340,790 | 4/1886 | Kochsmeier et al. ................... | 16/295 |
| 5,010,983 | 4/1991 | Kitamura ................................. | 188/67 |
| 5,037,231 | 8/1991 | Kitamura ............................... | 403/120 |
| 5,043,846 | 8/1991 | Kinoshita .............................. | 361/394 |
| 5,173,837 | 12/1992 | Blackwell et al. ..................... | 361/380 |
| 5,195,213 | 3/1993 | Ohgami et al. ........................... | 16/342 |
| 5,197,704 | 3/1993 | Kitamura .......................... | 248/292.11 |
| 5,239,731 | 8/1993 | Lu ........................................... | 16/340 |
| 5,467,504 | 11/1995 | Yang ...................................... | 16/342 |
| 5,566,048 | 10/1996 | Esterberg et al. ..................... | 261/681 |
| 5,704,581 | 1/1998 | Chen ..................................... | 248/371 |
| 5,749,124 | 5/1998 | Lu ........................................... | 16/307 |
| 5,751,548 | 5/1998 | Hall et al. .............................. | 361/686 |
| 5,894,633 | 4/1999 | Kaneko .................................... | 16/306 |

FOREIGN PATENT DOCUMENTS 59-99111   6/1984   Japan .

*Primary Examiner*—Anita M. King
*Attorney, Agent, or Firm*—Fitzpatrick, Cella, Harper & Scinto

[57] ABSTRACT

A supported body, such as a display panel or liquid crystal panel, is revolvably supported by a support via a revolution shaft and secured at an arbitrary revolution angle by a lock device. The lock device includes a torsion spring having a free end and a fixed end, into which the revolution shaft is inserted in an intimately contacting state, a holding member provided to the support or supported body so as to hold the revolution shaft rotatably and having an engaging part engaged with the fixed end of the torsion spring, and a stopper member secured to the revolution shaft and abutting the free end of the torsion spring for preventing coming-off of the fixed end of the torsion spring from the engaging part. In addition, an interlocked rotating member is disposed rotatably on the revolution shaft between the stopper member and the free end of the torsion spring so as to abut to and rotate together with the free end of the torsion spring when the supported body is revolved in a reverse direction relative to the winding direction of the torsion spring. The torsion spring and the stopper member can be replaced with a pair of torsion springs disposed so as to sandwich the interlocked rotating member which is typically ring-shaped.

18 Claims, 4 Drawing Sheets

LOCK DEVICE, DISPLAY APPARATUS AND LIQUID CRYSTAL APPARATUS

FIELD OF THE INVENTION AND RELATED ART

The present invention relates to a lock device for securing a supported body supported revolvably or tiltably around a revolution or tilting axis at an arbitrary tilting angle, particularly at an improved securing accuracy. The present invention also relates to a display apparatus and a liquid crystal apparatus including such a lock device.

When a display apparatus is used, e.g., in connection with a personal computer, the display panel surface or screen can cause a reflection of light, such as illumination light, in some cases depending on a state or a location of use, to make characters or pictures displayed on the screen uneasy to see. For obviating this difficulty, some apparatus is designed to include a tilting mechanism for tilting the display apparatus an arbitrary angle and a lock device at for securing the display apparatus at the aribitrary angle.

Various designs shapes of such a lock device have been proposed. FIG. 6 is a partial sectional view showing a vital portion of an example of such a lock device, and FIG. 7 is a right side view thereof excluding a member Y. Referring to these figures, the lock device includes a revolution or tilting axis member or shaft 2 having at one end thereof a connecting portion 2a for securing a supported body (or tiltable body) Y, such as a liquid crystal panel. The tilting shaft 2 is supported revolvably by a bracket 1 as a holding member fixed at a base member or support X, such as a stand of the liquid crystal apparatus.

The revolution shaft 2 is intimately inserted into a torsion spring 4 having a fixed end 4a fastened to the bracket 1 so that, when the revolvable body Y is revolved with an operation force in excess of a winding torque of the torsion spring 4 in a tightening or winding direction with respect to the fixed end 4a (referred to a "forward" direction), the revolution shaft 2 is rotated at an angle identical to the angle of revolution of the revolvable body relative to the base member X. When the operation for revolving the revolvable member is stopped, the revolution shaft 2 is locked by the winding force of the torsion spring 4 acting about the revolution shaft 2 to hold the revolvable body 4 at the revolved or tilted position.

On the other hand, when the revolvable body Y is revolved in a direction of loosening the torsion spring 4, i.e., a direction reverse to the winding direction of the torsion spring 4 (referred to as a "reverse" direction), the revolution shaft 2 is turned at an angle identical to the angle of revolution of the revolvable body Y, whereby a free end 4b of the torsion spring 4 is loosened relative to the revolution shaft 2 to cause a slipping. However, when the operation for revolving the revolvable body Y is stopped, the torsion spring 4 returns to tighten the revolution shaft 2, thereby locking the revolution shaft 2.

As a result, when a hand is left from the revolvable body Y, as the revolution moment of the revolvable body Y is determined by the gravity center position and angular position of the revolvable body Y, the revolvable body can be held at the position if the lock device retains a torque in excess of the revolution moment.

In a lock device having such a structure, the torsion spring 4 can move in an axial extension direction of the revolution shaft 2 to fall off from an engagement hole 1A as an engagement member of the bracket 1 as a result of repetitive rotation operation. For obviating this difficulty, a stop ring S as a stopping member is provided on the revolution shaft 2 so as to prevent the coming-off of the torsion spring 4. Further, a stop ring 3 is fitted on the revolution shaft 2 so as to prevent the revolution shaft 2 from coming off the bracket 1.

However, in the case where such a stop ring S is provided, when the revolvable body Y is revolved in the reverse direction, i.e., in the direction of loosening the torsion spring 4, the tip of the free end 4b of the torsion spring 4 is abutted to the stop ring S, thereby giving an obstructing load to the rotation of the torsion spring 4.

Further, if such an obstructing load to the rotation occurs, the torsion spring 4 cannot slip fully relative to the revolution shaft 2 to leave a torque acting on the revolution shaft in a direction of returning the torsion spring 4 to the original position. Thus, after stopping the revolution operation of the revolvable body Y, the revolvable body can be moved slightly backward by the remaining torque, thus providing a difficulty in securing the revolvable body Y at a desired arbitrary angle.

SUMMARY OF THE INVENTION

In view of the above-mentioned problems, an object of the present invention is to provide a lock device capable of securing a revolvable body at an arbitrary angle.

According to the present invention, there is provided a lock device for securing at an arbitrary revolution angle a supported body revolvably supported by a support via a revolution shaft, comprising:

a torsion spring into which the revolution shaft is inserted in an intimately contacting state, the torsion spring having a free end and a fixed end, a holding member provided to said support or supported body so as to hold the revolution shaft rotatably and having an engaging part engaged with the fixed end of the torsion spring, a stopper member secured to the revolution shaft and abutting the free end of the torsion spring for preventing coming-off of the fixed end of the torsion spring from the engaging part, and an interlocked rotating member disposed rotatably on the revolution shaft between the stopper member and the free end of the torsion spring so as to abut to and rotate together with the free end of the torsion spring when the supported body is revolved in a reverse direction relative to the winding direction of the torsion spring.

According to the present invention, there is further provided a lock device for securing at an arbitrary revolution angle a supported body revolvably supported by a support via a revolution shaft, comprising:

two torsion springs into which the revolution shaft is inserted in an intimately contacting state, said two torsion springs each having a fixed end and a free end and having mutually reverse winding directions with respect to their mutually opposite respective elongation directions from each fixed end to the free end, a pair of holding members provided to said support or supported body so as to hold the revolution shaft rotatably and respectively having engaging parts engaged with the respective fixed ends of the two torsion springs, and an interlocked rotation member disposed rotatably on the revolution shaft between the fixed ends of the two torsion springs so as to abut to and rotate together with the free ends of the two torsion springs when the supported body is revolved in a reverse direction relative to the winding direction of the torsion spring.

According to the present invention, there is also provided a lock device for securing at an arbitrary revolution angle a supported body revolvably supported by a support via a revolution shaft, comprising:

two torsion springs into which the revolution shaft is inserted in an intimately contacting state, said two torsion springs each having a fixed end and a free end and having mutually identical winding directions with respect to their mutually opposite respective elongation directions from each fixed end to the free end, a pair of holding members provided to said support or supported body so as to hold the revolution shaft rotatably and respectively having engaging parts engaged with the respective fixed ends of the two torsion springs, and an interlocked rotation member disposed rotatably on the revolution shaft between the fixed ends of the two torsion springs so as to abut to and rotate together with the free end of one of the two torsion springs when the supported body is revolved in a reverse direction relative to the winding direction of said one of the two torsion springs.

According to still another aspect of the present invention, there is further provided a display apparatus such as a liquid crystal apparatus, comprising:

(A) a display panel, such as a liquid crystal panel;

(B) a support for supporting the display panel revolvably via a revolution shaft; and (C) a lock device including:
a torsion spring into which the revolution shaft is inserted in an intimately contacting state, the torsion spring having a free end and a fixed end,
a holding member provided to said support or the display panel so as to hold the revolution shaft rotatably and having an engaging part engaged with the fixed end of the torsion spring,
a stopper member secured to the revolution shaft and abutting to the free end of the torsion spring for preventing coming-off of the fixed end of the torsion spring from the engaging part, and
an interlocked rotating member disposed rotatably on the revolution shaft between the stopper member and the free end of the torsion spring so as to abut to and rotate together with the free end of the torsion spring when the display panel is revolved in a reverse direction relative to the winding direction of the torsion spring.

According to a lock device of the present invention as described above for securing at an arbitrary angle a supported body revolvably supported by a support via a revolution shaft, the revolution shaft is inserted in an intimately contacting state into a torsion spring having a free end and a fixed end. Further, the revolution shaft is rotatably held by a holding member secured to the support or the supported body, and the fixed end of the torsion spring is engaged with an engaging part of the holding member. A stopper member is secured to the revolution shaft so as to prevent the fixed end of the torsion spring from coming off the engaging part. Further, an interlocked or mating rotating member composed typically of a ring member is mounted rotatably on the revolution shaft between the stopper member and the free end of the torsion spring so that, when the supported body is revolved in a reverse direction with respect to the winding direction (tightening direction) of the free end of the torsion spring, the interlocked rotation member is caused to abut to and rotate together with the free end of the torsion spring, whereby a load obstructing the rotation is prevented from acting on the torsion spring. Thus, by minimizing the obstructing load against the rotation of the torsion spring, the torsion spring can be easily loosened or unwound and slipped relative to the revolution shaft, thereby not leaving any returning torque adversely affecting the securing of the supported body at an arbitrary angle after stopping by the revolution operation.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
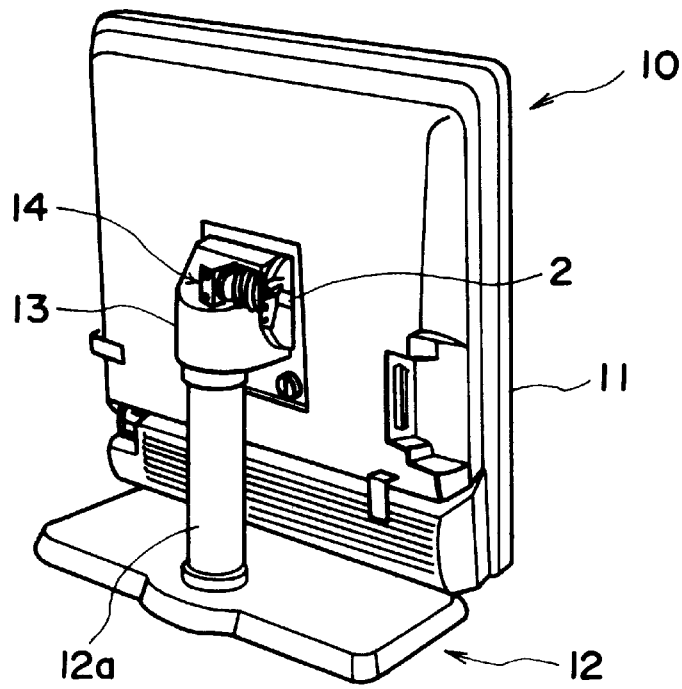
FIG. 1 is a back perspective view of a liquid crystal apparatus equipped with a first embodiment of the lock device according to the invention, including a partially exposed view of the lock device.
Figure 2:
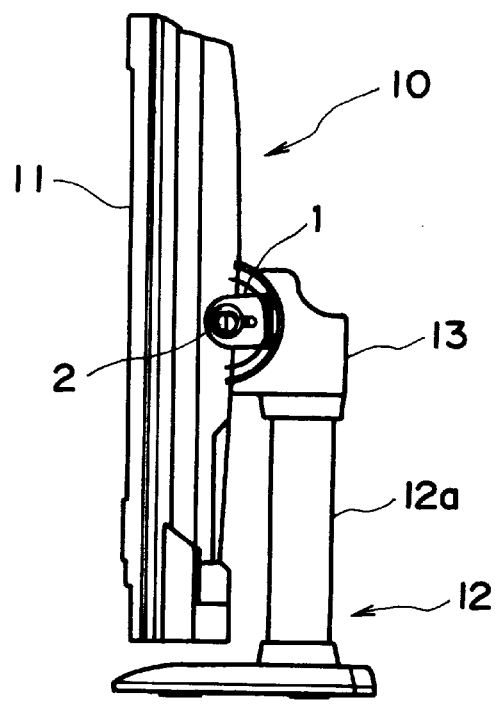
FIG. 2 is a side view of the liquid crystal apparatus shown in FIG. 1.

FIG. 1 is a back perspective view of a display apparatus equipped with a lock device according to a first embodiment of the present invention, and FIG. 2 is a side view of the display apparatus.

Referring to FIGS. 1 and 2, a display apparatus 10 includes a display panel 11, such as a liquid crystal panel, as a supported body; a stand 12 as a support for supporting the display panel at its back; and a lock device housing 13 disposed at an upper end of a post 12a of the support 12 and containing therein a lock device 14 for securing the display panel 11 at a desired angle.

Figure 3:
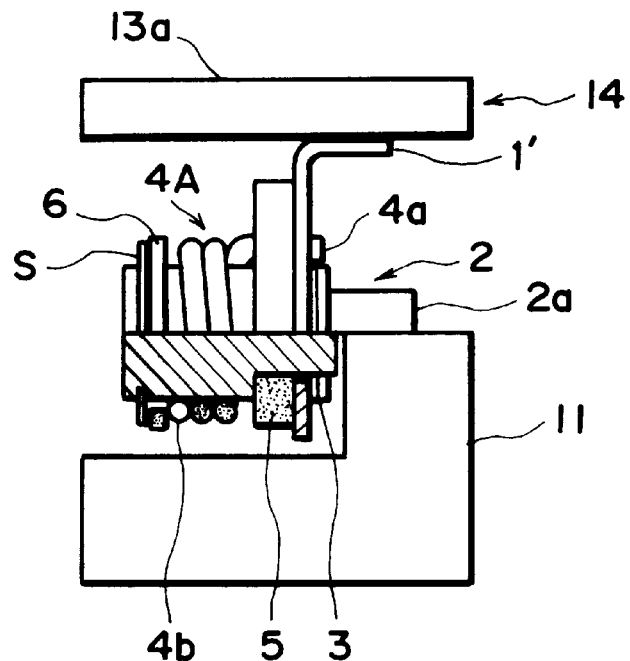
FIG. 3 is a partially sectional plan view of the lock device shown in FIG. 1 for illustrating the assembled state.

FIG. 3 is a partially sectional plan view for illustrating an assembled state of the lock device 14. Referring to FIG. 3, the lock device 14 includes a bracket 1' secured to a fixing plate 13a disposed within the housing 13. The bracket 1' comprises a metal plate having a sectional shape of character "L". To the bracket 1', a revolution shaft 2 having a connecting part 2a at at least one end thereof for connection with the display panel 11. The revolution shaft 2 is equipped with a stop ring 3 for preventing a coming-off from the bracket 1'.

Figure 6:
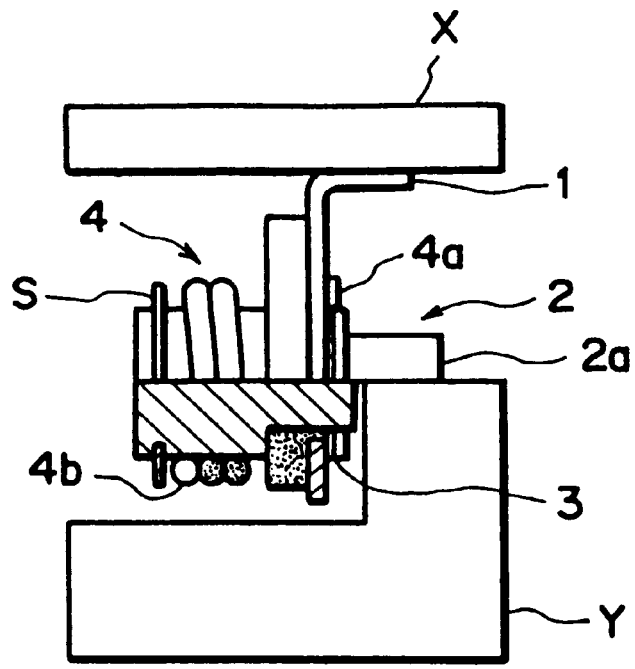
FIG. 6 is an illustration of a known lock device including a partial sectional view.
Figure 7:
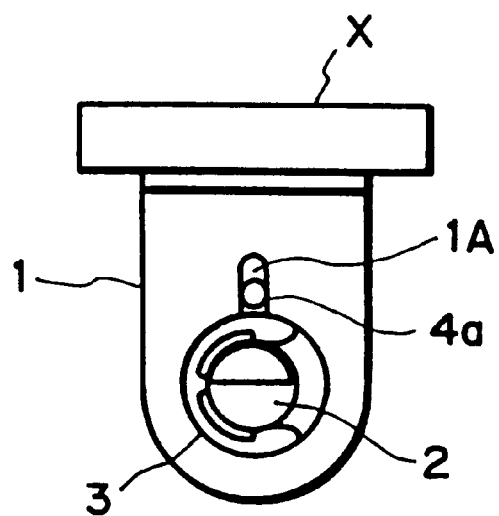
FIG. 7 is a side view of the lock device shown in FIG. 6.

The lock device further includes a torsion spring 4A having a fixed end 4a engaged with an engagement hole (as shown in FIG. 6) and a free end 4b through which the revolution shaft 2 inserted in intimate contact with the spring 4A. The bracket 1' is also engaged with a spring fixing member 5 having an engagement hole similar to that of the bracket 1' by inserting the fixed end 4a through the engagement holes of the spring fixing member 5 and the bracket 1' for engagement, thereby securing the fixed end of the torsion spring 4A.

Referring further to FIG. 3, the lock device further includes a ring member 6 as an interlocked or mating rotation member mounted on the revolution shaft 2 between the stop ring S and the free end 4b of the torsion spring 4A so that, when the panel 11 is revolved in a direction reverse to the winding direction of the torsion spring 4A, the ring member will abut to and rotate together with the free end 4b of the torsion spring 4A.

By providing such a ring member 6 abutting to and rotating together with the free end 4b, the torsion spring 4A can be easily loosened and slipped relative to the revolution shaft 2 when the panel 11 is revolved in a direction reverse to the winding direction of the torsion spring 4 with respect to the fixed end 4a.

When the ring member 6 is rotated, the ring member 6 is caused to slide with the stop ring S, the frictional force caused during the sliding is much smaller than the load of the rotation occurring when the torsion spring 4A directly abuts to the stop ring S, whereby no adverse effect is exerted to the loosening or unwinding and the slippage of the torsion spring 4A. Then, when the operation for revolution of the panel 11 is stopped, the torsion spring 4A is again caused to tighten the revolution shaft 2 and securely lock the revolution shaft 2.

The locking operation of the lock device is now described.

When the panel 11 is revolved in a direction of winding the torsion spring 4A at an operational force exceeding the winding force exerted by the torsion spring 4A, the revolution shaft 2 is rotated at an angle equal to the revolution angle of the panel 11. When the operation for revolving the panel 11 is stopped, the revolution shaft 2 is locked by the winding force of the torsion spring 4A acting on the revolution shaft 2.

On the other hand, when the display panel 11 is revolved in a direction reverse to the winding direction of the torsion spring 4A, the revolution shaft 2 is rotated at an angle identical to the revolution or tilting angle of the panel 11. As a result, the free end 4b of the torsion spring 4A opposite to the fixed end 4a engaged with the bracket 1' is moved in the direction of loosening together with the ring member 6 and slipped relative to the revolution shaft 2. However, when the revolution operation of the panel 11 is stopped, the torsion spring 4A again tightens the revolution shaft 2 to securely lock the revolution shaft 2.

In this way, by mounting the ring member 6 rotatably onto the revolution shaft 2, no adversely acting load is generated on the torsion spring 4A even when the panel 11 is revolved in a direction reverse to the winding direction of the torsion spring 4A. Accordingly, the torsion spring 4A is easily loosened and slipped relative to the revolution shaft 2, whereby the display panel 11 is reliably secured at an arbitrary angle.

Next, a lock device according to a second embodiment of the present invention will be described.

Figure 4:
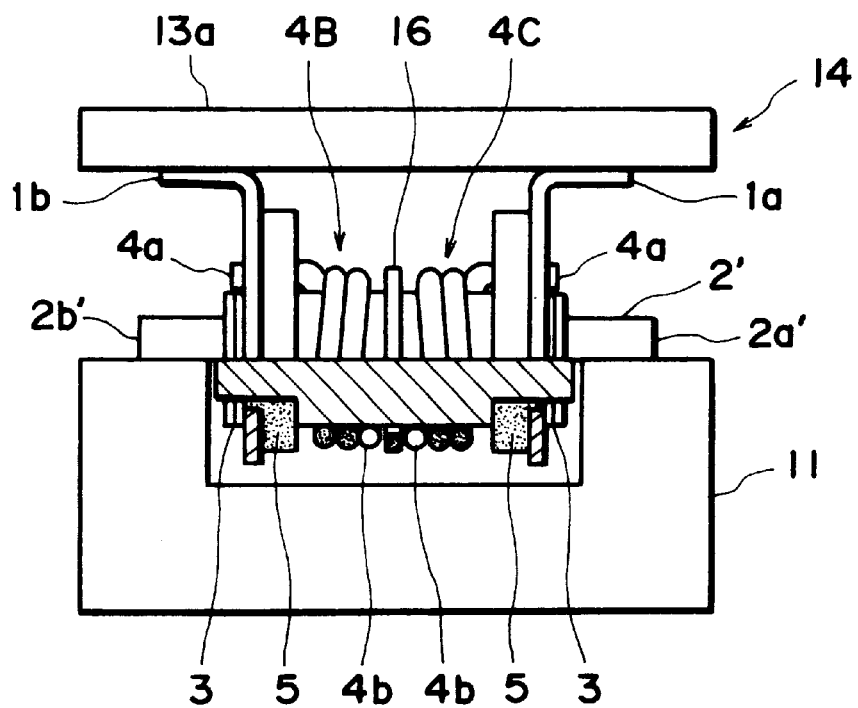
FIGS. 4 and 5 are illustrations of assembled states of second and third embodiments of the lock device according to the invention including a sectional view of a lower half of the revolution axis.

FIG. 4 is an illustration of an assembled state of a lock device according to this embodiment including a sectional view of a lower half of the revolution shaft. Referring to FIG. 4, the lock device includes brackets 1a and 1b affixed to a fixing plate 13a disposed within the housing 13. The brackets 1a and 1b each comprise a metal plate having a sectional shape of character "L".

A revolution shaft 2' is rotatably supported at its both ends with the brackets 1a and 1b so as to have a connecting part 2a' for connection with a panel 11 at at least one end thereof (and also another connecting part 2b' at another end in this embodiment). The revolution shaft 2' is provided with fitting grooves for stop rings 3, as desired, for preventing coming-off from the brackets 1a and 1b.

The revolution shaft 2' is inserted into free ends 4b in intimate contact therewith of a pair of torsion springs 4B and 4C having outside fixed ends 4a engaged with engagement holes of the brackets 1a and 1b. The torsion springs 4B and 4C extend in mutually opposite directions from their outer fixed ends 4a and wound in mutually opposite winding directions to reach their free ends 4b.

The lock device further includes a ring member 16 mounted rotatably on the revolution shaft 2' between the torsion springs 4B and 4C so as to abut the free ends 4b of the torsion springs 4B and 4C.

By providing such a ring member 16, when the panel is revolved in a direction reverse to the winding direction of, e.g., one torsion spring 4B (which is also a direction reverse to the winding direction of the other torsion spring 4C), the revolution shaft 2' is rotated at an angle equal to the revolution angle of the panel 11, while loosening and slipping the free ends 4b of the torsion springs 4B and 4C together with the ring member 16 relative to the revolution shaft 2'. However, when the revolution operation is terminated, the torsion springs 4B and 4C again tighten the revolution shaft 2' to securely lock the revolution shaft 2' in cooperation.

Incidentally, in case where torsion springs 4B and 4C are used as described above, it is possible to dispose a stop ring S as shown in FIG. 3 at a central part of the revolution shaft 2' and dispose ring members on both sides of the stop ring S. However, if a ring member 16 is disposed between two torsion springs 4B and 4C so that the ring member 16 can also function as a stop ring as in the above embodiment, the lock device structure can be simplified and produced at a lower cost.

Next, a lock device according to a third embodiment of the present invention will be described.

Figure 5:
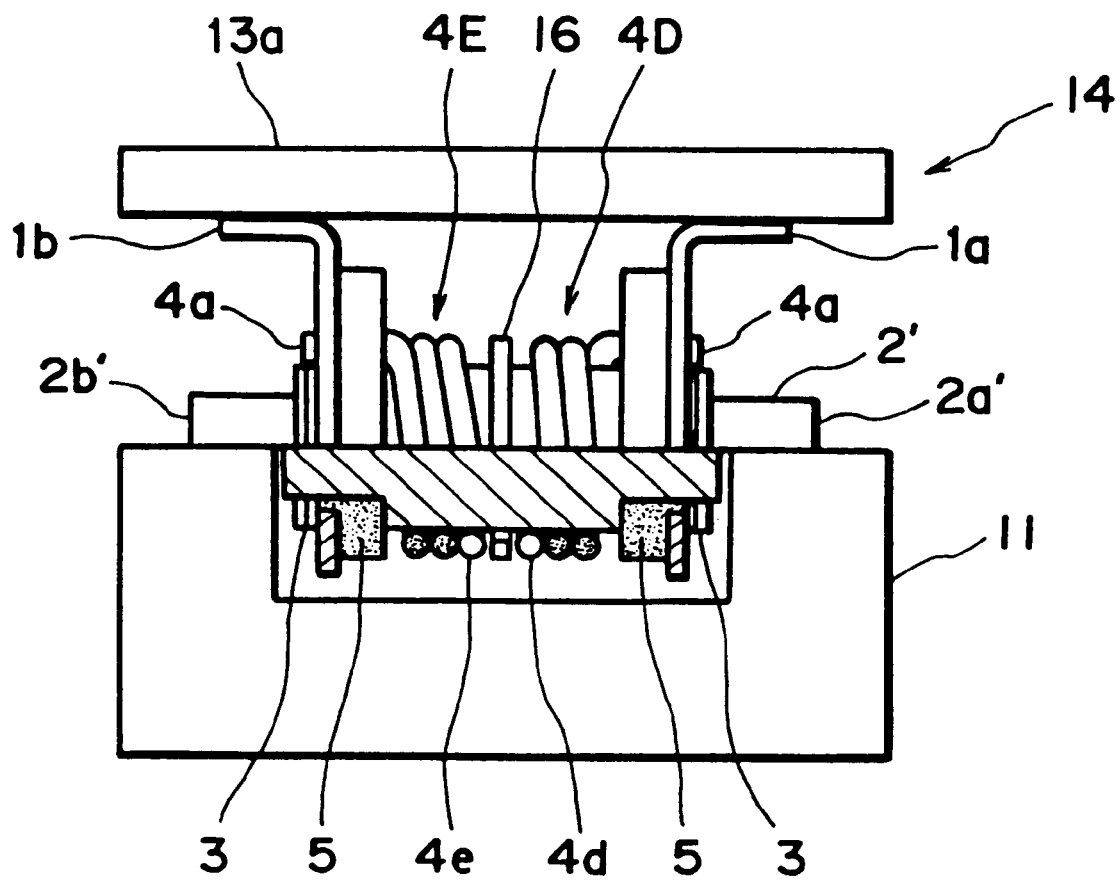

FIG. 5 is an illustration similar to FIG. 4 of an assembled state of a lock device according to this embodiment including a sectional view of a lower half of the revolution shaft. Referring to FIG. 5, this embodiment is different from the previous embodiment shown in FIG. 4 only in that two torsion springs 4D and 4E having identical directions of winding in directions of extensions thereof from their fixed ends 4a to free ends 4d and 4e in contrast with the opposite winding directions in FIG. 4.

As a result, when the panel 11 is revolved in a direction reverse to the winding direction of, e.g., one torsion spring 4D, a revolvable shaft 2' connected to the panel 11 at both connecting parts 2a' an 2b' is rotated at an angle equal to the revolution angle of the panel 11. As a result, the free end 4d of the torsion spring 4D is loosened and slipped together with the abutted ring member 16 relative to the revolution shaft 2'. However, when the revolution operation of the panel 11 is stopped, the torsion spring 4D again tightens the revolution shaft 2' to lock the resolution shaft 2'.

In contrast thereto, the above resolution direction of the panel 11 is a forward direction with respect to the winding direction of the torsion spring 4E. As far as the revolution operation force exceeds the winding force of the torsion shaft 4E, the revolution shaft 2' is revolved at an angle equal to the revolution angle of the panel 11. When the revolution operation of the panel 11 is stopped, the revolution shaft 2' is again locked by the winding force of the torsion spring 4E in cooperation with that of the torsion spring 4D.

Incidentally, during the revolution operation of the panel 11, the free end 4e of the torsion spring 4E exerts only a substantially smaller frictional force against the ring member 16 than that exerted by the free end 4d of the torsion spring 4D, so that the mating of the ring member 16 with the free end 4d of the torsion spring 4D is not hindered.

Also in this embodiment, the single ring member 16 can be replaced with a stop ring and a pair of ring members sandwiching the stop ring.

In the above embodiments, the panel is revolved vertically, but the lock device of the present invention can be also applicable to a horizontally or laterally revolving panel or supported body.

As described above, according to the present invention, a revolution shaft is provided with an interlocked or mating rotation member rotatably mounted thereon so that, when the supported boy is revolved in a reverse direction with respect to the winding direction of the torsion spring, the interlocked rotation member is caused to abut and rotate together with the free end of the torsion spring, whereby the obstructing load against the rotation of the torsion spring can be reduced. As the torsion spring can be easily rotated and slipped relative to the revolution shaft, an adverse stress causing a later shift of the revolvable body is not left to securely lock the revolvable body at an arbitrary angle after the revolution operation of the revolvable body.

As a result, if the lock device of the present invention is used in the display apparatus, such as a display used in connection with a computer, etc., the display can be easily adjusted at an arbitrary angle so as to obviate uneasy-to-see characters or picture on the screen or display surface of the display apparatus liable to be caused by incidence and reflection of illumination light, etc., to users' eyes depending on the state and location of use. Accordingly, the lock device according to the present invention is believed to have a large industrial value.

What is claimed is:

1. A lock device for securing at an arbitrary revolution angle a supported body revolvably supported by a support, comprising:

a revolution shaft;

a torsion spring into which said revolution shaft is inserted in an intimately contacting state, said torsion spring having a free end side and a fixed end, a holding member for attachment to the support or supported body so as to hold said revolution shaft rotatably and having an engaging part engaged with the fixed end of said torsion spring;

a stopper member secured to said revolution shaft the free end side of said torsion spring for preventing the fixed end of said torsion spring from coming off of said engaging part; and an interlocked rotating member disposed rotatably on said revolution shaft between said stopper member and the free end of said torsion spring so as to abut to and rotate together with the free end of the torsion spring when the supported body is revolved in a reverse direction relative to the winding direction of said torsion spring.

2. A lock device according to claim 1, wherein said interlocked rotating member is in the form of a ring.

3. A lock device for securing at an arbitrary revolution angle a supported body revolvably supported by a support, comprising:

a revolution shaft;

two torsion springs into which said revolution shaft is inserted in an intimately contacting state, said two torsion springs each having a fixed end and a free end and having mutually reverse winding directions with respect to their mutually opposite respective elongation directions from each fixed end to the free end;

a pair of holding members for attachment to the support or supported body so as to hold said revolution shaft rotatably and respectively having engaging parts engaged with the respective fixed ends of said two torsion springs; and an interlocked rotating member disposed rotatably on said revolution shaft between the fixed ends of said two torsion springs so as to abut to and rotate together with the free ends of the two torsion springs when the supported body is revolved in a reverse direction relative to the winding direction of said torsion springs.

4. A lock device according to claim 3, wherein said interlocked rotating member is in the form of a ring.

5. A lock device for securing at an arbitrary revolution angle a supported body revolvably supported by a support, comprising:

a revolution shaft;

two torsion springs into which said revolution shaft is inserted in an intimately contacting state, said two torsion springs each having a fixed end and a free end and having mutually identical winding directions with respect to their mutually opposite respective elongation directions from each fixed end to the free end;

a pair of holding members for attachment to the support or supported body so as to hold said revolution shaft rotatably and respectively having engaging parts engaged with the respective fixed ends of said two torsion springs; and an interlocked rotating member disposed rotatably on said revolution shaft between the fixed ends of said two torsion springs so as to abut to and rotate together with the free end of one of said two torsion springs when the supported body is revolved in a reverse direction relative to the winding direction of said one of said two torsion springs.

6. A lock device according to claim 5, wherein said interlocked rotating member is in the form of a ring.

7. A display apparatus, comprising:

(A) a display panel;

(B) a support for supporting said display panel; and (C) a lock device including:

a revolution shaft;

a torsion spring into which said revolution shaft is inserted in an intimately contacting state, said torsion spring having a free end side and a fixed end, a holding member attached to said support or said display panel so as to hold said revolution shaft rotatably and having an engaging part engaged with the fixed end of said torsion spring;

a stopper member secured to said revolution shaft at the free end side of said torsion spring for preventing the fixed end of said torsion spring from coming off of said engaging part; and an interlocked rotating member disposed rotatably on said revolution shaft between said stopper member and the free end of said torsion spring so as to abut to and rotate together with the free end of said torsion spring when said display panel is revolved in a reverse direction relative to the winding direction of said torsion spring.

8. A display apparatus according to claim 7, wherein said support supports said display panel at the back of said display panel, and said lock device is mounted at an upper end of said support.

9. A liquid crystal apparatus, comprising:

(A) a liquid crystal panel;

(B) a support for supporting said display panel revolvably; and (C) a lock device including:

a revolution shaft;

a torsion spring into which said revolution shaft is inserted in an intimately contacting state, said torsion spring having a free end side and a fixed end, a holding member attached to said support or said liquid crystal panel so as to hold said revolution shaft rotatably and having an engaging part engaged with the fixed end of said torsion spring;

a stopper member secured to said revolution shaft at the free end side of said torsion spring for preventing the fixed end of said torsion spring from coming off of said engaging part; and an interlocked rotating member disposed rotatably on said revolution shaft between said stopper member and the free end of said torsion spring so as to abut to and rotate together with the free end of said torsion spring when said liquid crystal panel is revolved in a reverse direction relative to the winding direction of said torsion spring.

10. A liquid crystal apparatus according to claim 9, wherein said support supports said liquid crystal panel at a back of said liquid crystal panel, and said lock device is mounted at an upper end of said support.

11. A display apparatus, comprising:
(A) a display panel;
(B) a support for supporting said display panel revolvably; and
(C) a lock device including:
a revolution shaft;
two torsion springs into which said revolution shaft is inserted in an intimately contacting state, said two torsion springs each having a fixed end and a free end and having mutually reverse winding directions with respect to their mutually opposite respective elongation directions from each fixed end to the free end;
a pair of holding members attached to said support or display panel so as to hold said revolution shaft rotatably and respectively having engaging parts engaged with the respective fixed ends of said two torsion springs; and
an interlocked rotating member disposed rotatably on said revolution shaft between the fixed ends of said two torsion springs so as to abut to and rotate together with the free ends of said two torsion springs when said display panel is revolved in a reverse direction relative to the winding direction of said torsion springs.

12. A display apparatus according to claim 11, wherein said support supports said display panel at a back of said display panel, and said lock device is mounted at an upper end of said support.

13. A liquid crystal apparatus, comprising:
(A) a liquid crystal panel;
(B) a support for supporting said liquid crystal panel revolvably; and
(C) a lock device including:
a revolution shaft;
two torsion springs into which said revolution shaft is inserted in an intimately contacting state, said two torsion springs each having a fixed end and a free end and having mutually reverse winding directions with respect to their mutually opposite respective elongation directions from each fixed end to the free end;
a pair of holding members attached to said support or said liquid crystal panel so as to hold said revolution shaft rotatably and respectively having engaging parts engaged with the respective fixed ends of said two torsion springs; and
an interlocked rotating member disposed rotatably on said revolution shaft between the fixed ends of said two torsion springs so as to abut to and rotate together with the free ends of said two torsion springs when said liquid crystal panel is revolved in a reverse direction relative to the winding direction of said torsion springs.

14. A liquid crystal apparatus according to claim 13, wherein said support supports said liquid crystal panel at the back of the liquid crystal panel, and the lock device is mounted at an upper end of said support.

15. A display apparatus, comprising:
(A) a display panel;
(B) a support for supporting said display panel revolvably; and
(C) a lock device including:
a revolution shaft;
two torsion springs into which said revolution shaft is inserted in an intimately contacting state, said two torsion springs each having a fixed end and a free end and having mutually identical winding directions with respect to their mutually opposite respective elongation directions from each fixed end to the free end;
a pair of holding members attached to said support or said display panel so as to hold said revolution shaft rotatably and respectively having engaging parts engaged with the respective fixed ends of said two torsion springs; and
an interlocked rotating member disposed rotatably on said revolution shaft between the fixed ends of said two torsion springs so as to abut to and rotate together with the free ends of one of said two torsion springs when said display panel is revolved in a reverse direction relative to the winding direction of said one of said two torsion springs.

16. A display apparatus according to claim 15, wherein said support supports said display panel at a back of said display panel, and said lock device is mounted at an upper end of said support.

17. A liquid crystal apparatus, comprising:
(A) a liquid crystal panel;
(B) a support for supporting said liquid crystal panel revolvably; and
(C) a lock device including:
a revolution shaft;
two torsion springs into which said revolution shaft is inserted in an intimately contacting state, said two torsion springs each having a fixed end and a free end and having mutually identical winding directions with respect to their mutually opposite respective elongation directions from each fixed end to the free end;
a pair of holding members attached to said support or said liquid crystal panel so as to hold said revolution shaft rotatably and respectively having engaging parts engaged with the respective fixed ends of said two torsion springs; and
an interlocked rotating member disposed rotatably on said revolution shaft between the fixed ends of said two torsion springs so as to abut to and rotate together with the free ends one of said two torsion springs when said liquid crystal panel is revolved in a reverse direction relative to the winding direction of said one of said two torsion springs.

18. A liquid crystal apparatus according to claim 17, wherein said support supports said liquid crystal panel at a back of said liquid crystal panel, and said lock device is mounted at an upper end of said support.

* * * * *

UNITED STATES PATENT AND TRADEMARK OFFICE
CERTIFICATE OF CORRECTION

PATENT NO. : 6,145,797
DATED : November 14, 2000
INVENTOR(S) : Makoto Uehara

Page 1 of 1

It is certified that error appears in the above-identified patent and that said Letters Patent is hereby corrected as shown below:

Column 1,
Line 19, "an arbitrary" should read -- at an arbitrary -- and "at for" should read -- for --.

Column 7,
Line 42, "shaft the" should read -- shaft at the --.

Column 10,
Line 58, "one of" should read -- of one of --.

Signed and Sealed this

Twenty-sixth Day of February, 2002

Attest:

JAMES E. ROGAN
*Attesting Officer*   *Director of the United States Patent and Trademark Office*